3,156,738
ISOMERIZATION OF HEXANES WITH
FRIEDEL-CRAFTS CATALYST
William S. Reveal, Orinda, and William E. Ross, Danville, Calif., assignors to Shell Oil Company, New York, N.Y., a corporation of Delaware
Filed Sept. 21, 1961, Ser. No. 139,742
8 Claims. (Cl. 260—683.75)

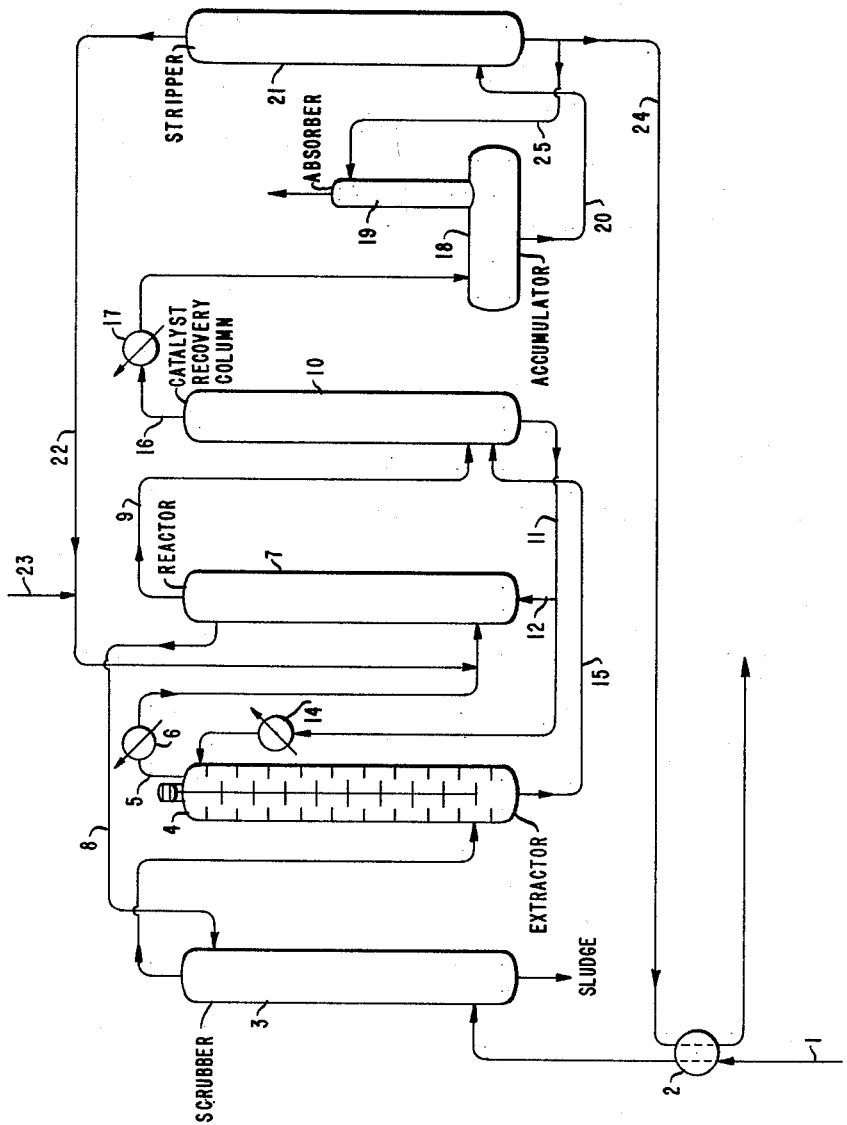

This invention relates to the isomerization of hydrocarbons with the aid of catalysts comprising a metal halide of the Friedel-Crafts type and relates more particularly to an improved process for the isomerization of hexane fractions with the aid of fluid catalysts comprising a halide of aluminum.

With the trend to high-octane, low-sensitivity gasolines required to satisfy the high-compression-ratio automotive engines recently introduced, attention has been directed to the processing of light naphtha fractions to provide a component necessary for high-octane gasoline of proper volatility and road performance. Since highly branched chain paraffinic hydrocarbons have high antiknock properties, attention has been directed to the catalytic isomerization of less highly branched chain paraffinic hydrocarbons to provide the desired blending components for motor gasoline.

Various processes for the isomerization of light naphtha fractions are known to the art and can be classified as high temperature or low temperature processes. High temperature isomerization is generally carried out at a temperature above 570° F. by contact with heterogeneous catalysts containing metals or metal salts including oxides and sulfides which have hydrogenating activity. Recently, several high temperature isomerization processes employing metal catalysts have been developed and are now commercially available. Several of these processes are summarized and further literature references to each are given in the Oil and Gas Journal, No. 14, pages 151–154, April 3, 1961. The high operating temperatures required in such processes are disadvantageous because isomerization is an equilibrium reaction, so that the production of more highly branched isomers decreases with an increase in the processing temperature. As a result, at the high temperatures employed, the equilibrium product contains substantial quantities of low octane number paraffins which are not isomerized during the course of the reaction. In addition, it has been reported that as the equilibrium conversion is approached the gas loss increases very sharply.

In low temperature isomerization, where equilibrium is more favorable, the catalyst usually employed is a metal halide of the Friedel-Crafts type. The halides of aluminum, particularly aluminum chloride and/or aluminum bromide, are the most common. Aluminum chloride is generally the most economical and efficient catalyst and may be employed as a powdered anhydrous aluminum chloride suspended in the hydrocarbon to be converted, supported on an absorptive carrier, such as alumina, in the form of a fixed catalyst bed, or in the form of a hydrocarbon complex addition compound such as a Gustavson complex.

Still another type of Friedel-Crafts catalyst is the fluid or molten salt type, wherein the active metal halide is dissolved in a suitable carrier. Suitable carriers comprise fluid materials capable of introducing the metal halide, such as aluminum chloride, into the reaction zone in dilute solution, thereby obviating local concentrations of the active catalyst and enabling its immediate dispersal through the reaction zone. The carrier is preferably one that is inert, or at least has no deleterious effect upon the catalyst, reactants or operating conditions at the conditions of execution of the process. It is, furthermore, advantageous to use as the carrier one that is readily separable by available means from the reactor effluence within the system.

A particularly suitable carrier for aluminum chloride catalyst is antimony trichloride which is inert and innocuous to the execution of the process. Additionally, antimony trichloride is readily separable from hydrocarbon and hence is easily recovered. Separation and use of the fluid melt catalyst comprised of aluminum chloride and antimony chloride are described in U.S. 2,370,195 to Ross, dated February 27, 1945, and U.S. 2,387,868 to Anderson et al., dated October 30, 1945. The isomerization reaction may be executed in the liquid, vapor or mixed phase.

The Friedel-Crafts type catalysts are adversely affected by impurities often inherent in many of the available feeds. Therefore, isomerization processes employing these catalysts have been heretofore limited generally to normal butane and normal pentane which can be rather easily obtained as relatively pure streams in the refinery. Normal hexane generally occurs as a component of straight-run naphtha fractions containing not only normal hexanes but also other $C_6$ hydrocarbons such as branched hexanes, methylcyclopentane and benzene. Separation of normal hexane from such a fraction by conventional distillation is not practical due to relatively close boiling points of the hydrocarbons and to azeotropes which are formed. Consequently, available hexane fractions include impurities, such as benzene, which have a decidedly detrimental effect upon the efficiency with which the Friedel-Crafts catalyst can be employed.

The presence of any substantial amount of benzene generally results in a marked decline in the rate of conversion to the desired product as well as the decrease in the active life of the catalyst. For example, one of the desired isomerization reactions is the conversion of methylpentanes to dibranched butanes, i.e., dimethylbutanes. The inclusion of only 1% benzene in the hydrocarbon feed will reduce the desired conversion by nearly 50% and increase catalyst consumption, measured in terms of pounds of dimethylbutane produced per pound of aluminum chloride, by nearly 60%. Therefore, since most commercially available hexane streams contain more than 1% benzene, usually 3 to 5% and higher, isomerization of hexanes with the Friedel-Crafts type of catalyst has not been commercially practical.

Moreover, the aromatic hydrocarbons which are present in the isomerization feed hydrocarbons are taken up by a molten catalyst comprising a metal halide of the Friedel-Crafts type, such as aluminum chloride. The aromatic hydrocarbons react with the aluminum chloride in the presence of the hydrogen halide promoter to form an aluminum chloride-hydrocarbon complex, or sludge, which is retained in the catalyst mass. In order to remove the sludge and to avoid its accumulation in the reactor, a portion of the catalyst mass must be continuously withdrawn from the reactor and subjected to suitable treatment to "clean up" the catalyst. Breakdown and removal of hydrocarbon from the complex by stripping the catalyst mass with an inert gas has been attempted with little practical success. The conventional practice of removing sludge from the system is to scrub the catalyst with a hydrocarbon such as the feed to recover soluble catalyst components, such as the antimony chloride and active aluminum chloride, while leaving a residue comprising insoluble sludge.

It is known to remove benzene and other aromatics from hydrocarbon streams such as by extractive distillation or by extraction by a solvent selective for aromatics, e.g., diethylene gylcol plus water, sulfolane, sulfur dioxide, dipropylene glycol, mixtures of dipropylene glycol with diethylene glycol and water, and the like. Thus, while such aromatic extraction processes are known, they are impractical and highly uneconomical for use on paraffinic hydrocarbon streams containing only a small concentration of aromatics, such as the straight run hexane fractions which desirably are to be isomerized with a Friedel-Crafts type catalyst.

It is an object of this invention to provide an improved process for the isomerization of hexanes with a Friedel-Crafts catalyst. More particularly, it is an object of this invention to provide an improved process for the isomerization of hexanes with a catalyst comprising a fluid melt of aluminum chloride in antimony trichloride. It is a further object of this invention to provide an improved process for selectively removing aromatics from hexane fractions which are subsequently isomerized with the aid of a catalyst comprising a fluid melt of aluminum chloride in antimony trichloride. These objects and others will be better understood from the following detailed description of the process according to this invention.

It has now been found that aromatic impurities can be removed economically and effectively from the paraffinic feed to an isomerization process employing a Friedel-Crafts type catalyst by extraction with liquid antimony trichloride. In the process of the invention, a paraffinic hydrocarbon stream containing a minor amount of aromatic impurities is contacted with liquid antimony trichloride in an extraction zone wherein aromatics in the feed are extracted by the antimony trichloride. A minor amount of aromatic impurity is considered to be an amount less than 15% by weight, preferably less than 10% by weight of the total fraction. The hydrocarbon, now of reduced aromatic content, is separated from the antimony trichloride and passed to an isomerization reaction zone, while the antimony trichloride, containing extracted aromatics, is passed to a separation zone for recovery of the aromatics.

In order to set forth more clearly the nature of the invention, it will be described in more detail in its application to the liquid phase isomerization of hydrocarbons initially containing aromatic hydrocarbons as an impurity with the aid of a fluid catalyst mixture comprising aluminum chloride and antimony trichloride. Reference is made to the attached drawing, wherein the sole figure represents schematically a preferred mode for carrying out the process of the invention.

Referring to the drawing, a hexane fraction comprising isomerizable saturated hydrocarbons and an aromatic hydrocarbon impurity, about 15% by weight benzene, is passed from an outside source through line 1 into a suitable heating zone 2 shown as a product of feed exchanger, wherein it is heated to a temperature sufficiently high to maintain the desired temperature conditions in subsequent scrubbing, extraction and reaction zones. From the heating zone the heated hydrocarbon stream is passed into catalyst scrubbing column 3. Within catalyst scrubbing column 3 the hydrocarbon stream is contacted in the liquid phase with a portion of the spent catalyst melt emanating from the reaction zone as described more fully below. The liquid hexane stream from catalyst scrubbing column 3, containing dissolved catalyst components, is passed into extractor 4.

Extractor 4 comprises an extraction zone wherein the hexane stream containing benzene impurity is contacted with antimony trichloride. It is necessary for effective scrubbing of sludged spent catalyst that the scrubbing column precede the extractor in the flow scheme of the process, since catalyst melt components, i.e., aluminum chloride and antimony trichloride, are dissolved in the hexane feed. Should the order of scrubbing followed by extraction be reversed, the feed will become substantially saturated with antimony trichloride in the extraction step and, therefore, ineffective in recovering catalyst melt components from the sludged spent catalyst.

Preferably, the antimony trichloride to be contacted with hexane feed in the extraction zone is obtained from the catalyst recovery column 10, as will be hereinafter described. Thus, in accordance with the invention, the benzene impurity is dissolved in the antimony trichloride solvent in extractor 4 and, thus removed from the hexane to be isomerized. By this means the concentration of benzene in the hexane stream can be reduced to about 0.1% by weight. Antimony trichloride has the additional advantage of removing methylcyclopentane, as well as benzene, from the hexane feed. It is desirable to remove methylcyclopentane from the feed because methylcyclopentane is isomerized in the reactor to cyclohexane, which has a lower octane number than methylcyclopentane.

Extractor 4 suitably can be any know device for executing liquid-liquid extraction. Suitable devices comprise combinations of mixers and settlers and countercurrent columns, operating continuously. For example, wetted-wall, spray, packed sieve or perforated plate, bubble plate or baffled columns, or modification thereof, are suitable devices. Vertical columns containing no internals are likewise suitable. Columns with internal agitators, such as rotating disc contactors, are preferred.

Small amounts of the aromatic hydrocarbons, for example, about 0.1% by weight, possess the desired attribute of suppressing hydrocarbon decomposition reactions at the low or moderately elevated temperatures generally employed in the execution of isomerization reactions with the aid of the fluid melt catalysts. Tolerance of small amounts of aromatics in the hydrocarbon feed would, furthermore, be desirable since removal of the last traces of this impurity from the charge is often difficult and generally economically undesirable.

The solubility of benzene in antimony trichloride is directly related to temperature, so that as the temperature of the extraction zone is increased, solubility is increased. It is preferred that the temperature of the extraction zone be the same as that of the reaction zone, or lower, as additional cooling of the hydrocarbon feed from the extraction zone which is saturated with catalyst melt components, would lead to precipitation of heavy catalyst melt components which could plug the exchanger tubes. The temperature range within which the extraction is executed is from about 120° F. to about 300° F., preferably in the range from about 160° F. to about 210° F. Pressure on the extraction zone is sufficient to maintain the hydrocarbon preferably in the liquid phase and generally is in the range from about 200 p.s.i.g. to about 50 p.s.i.g., preferably in the range from about 250 p.s.i.g. to about 350 p.s.i.g.

At any given temperature the solvent to feed ratio must be increased as the concentration of benzene in the hydrocarbon feed is increased. In the normal benzene concentration range from about 0.5% to about 5% by weight, the preferred solvent to feed weight ratio is in the range from about 1:1 to about 3:1.

Table 1 gives a range of solvent flows that are required at various extract benzene recoveries corresponding to a benzene concentration of about 0.1% w. in the raffinate, on the basis of four simple extraction stages. Recovery is increased as the number of extraction steps is increased.

TABLE 1

Solvent Requirements, $SbCl_3$ Extraction of Benzene From a Benzene-Hexane Feed

[t=176° F.]

| Benzene in the Feed, percent, w. | Recovery of Benzene in the Extract, percent w. | Solvent to Feed Ratio by Weight, (S/F) w. | Solvent to Feed Ratio by Volume, (S/F) v. |
|---|---|---|---|
| 1.0 | 90 | 1.35 | 0.31 |
| 2.5 | 96 | 1.85 | 0.42 |
| 5.0 | 98 | 2.3 | 0.54 |

The hydrocarbon stream from the extraction zone, now substantialy free of aromatics, i.e., containing about 0.1% w. benzene, or less, passes through line 5 into a reaction zone consisting of a suitable reactor 7. Cooler 6 is used is used as necessary to maintain reaction zone temperature.

The reactor 7 may suitably be of the conventional stirrer type or, preferably, a vertical tower as illustrated. Within reactor 7 the hydrocarbon stream is contacted with a fluid isomerization catalyst. A suitable catalyst for hexane isomerization consists of a molten mixture of antimony trichloride and aluminum chloride in appropriate proportions of 84 to 98% by weight $SbCl_3$ and 16 to 2% by weight $AlCl_3$. A suitable isomerization temperature in the range of from room temperature to about 480° F. and preferably from about 120° F. to about 300° F. is maintained within reactor 7.

The isomerization is preferably effected in the presence of a halogen halide such as hydrogen chloride. This is preferably introduced into the reaction zone with the hydrocarbon feed as a recycle stream through line 22. The amount of hydrogen chloride introduced into the system may vary widely in accordance with the nature of the charge, the catalyst compositions and the operating conditions. In cases where it is not desired to recover and recycle the hydrogen chloride, the minimum quantities, such as from about 0.3 to 5% by weight of the hydrocarbon feed, may be employed. When the hydrogen chloride is recycled, however, much larger quantities, for instance, up to 25% by weight of the hexane charge may be economically employed. Concentrations between 4 and 8% are preferred. If desired, a limited amount of hydrogen, not more than about 3% molar of the hexane charge, may be introduced with the hydrogen chloride to suppress cracking or other undesirable side reactions in the conventional process.

A portion of the catalyst melt is withdrawn from the reactor continuously or intermittently through line 8, and passed to the upper section of catalyst scrubbing column 3. The portion of the catalyst melt introduced into scrubbing column 3, having a much higher specific gravity than the hydrocarbon, settles to the bottom of the vessel countercurrently to the upflowing liquid hydrocarbon. Catalyst melt components comprising active aluminum chloride catalyst and antimony trichloride are dissolved in the hydrocarbon stream and passed therewith via extractor 4 to reactor 7. Catalyst sludge, insoluble in the hydrocarbon stream, is separated therefrom as a heavy fluid residue and is periodically withdrawn from the bottom of the scrubber.

The hydrocarbon and molten salt catalyst components in the reactor readily separate due to their widely different specific gravities and viscosities. The hydrocarbon reaction effluent, having a much lower specific gravity and viscosity, rises to the top of the reactor and passes therefrom through line 9 into a catalyst recovery column 10. The reaction effluent contains only a minor proportion of dissolved catalyst components, i.e., about 10–16% by weight, predominantly antimony trichloride. The proportion of aluminum chloride contained therein is substantially less than the amount comprised in the reaction zone. The catalyst recovery column 10 comprises a separation zone wherein hydrocarbon is separated from the catalyst melt by a known means, such as distillation, solvent extraction, or the like. A bubble-cap tray distillation column will suitably effect the desired separation.

Within recovery column 10, then, a liquid metal halide fraction consisting essentially of antimony trichloride is separated from a vapor fraction comprising hydrocarbons, including hydrogen chloride promoter. The liquid metal halide fraction is comprised predominantly of antimony trichloride and only a very minor proportion of aluminum chloride, which amount is substantially less than that amount comprised in the reaction zone. A part of this fraction is withdrawn from column 10 and passed through lines 11 and 12 to reactor 7 to maintain catalyst inventory in the reactor. At least part of the molten antimony trichloride fraction passes through line 11 containing cooler 14 into extractor 4. Cooler 14 is generally desired to reduce the temperature of the antimony trichloride solvent stream, which is hotter than the desired extraction temperature, in order to avoid excessive heating of the hexane feed stream. It is necessary to regulate the solvent temperature carefully so that the molten antimony trichloride will not freeze.

In the rotating disc contactor/extractor 4 the hydrocarbon stream containing benzene contacts antimony trichloride from the catalyst recovery column. The antimony trichloride, because of its much higher specific gravity, is injected into the upper section or top of the contactor and the hydrocarbon is injected at the bottom. The benzene component of the hydrocarbon stream is absorbed in the antimony trichloride and thereby removed from the hydrocarbon feed. Antimony trichloride containing benzene is withdrawn from the bottom of the extractor through line 15 and returned to the bottom of column 10, or may, if desired, be introduced to column 10 with the reaction zone effluent in line 9. In the recovery column, benzene is separated from the antimony trichloride and recovered with the hydrocarbon overhead vapors.

Vapors overhead comprising isomerizate and recovered benzene is passed from column 10 through line 16 containing condenser 17 into an accumulator 18. Uncondensable material comprising hydrogen chloride and some gas formed in the system is usually passed continuously from accumulator 18 into the lower part of absorber 19. In absorber 19 the uncondensable material is contacted with a suitable absorbing medium, such as a portion of isomerizate product, introduced into the upper part of the absorber by line 25. HCl is absorbed by the absorbing medium and returned to accumulator 18. Unabsorbed gases from absorber 19, comprising vapors and gas substantially free of any HCl, are discarded from the system. If desired, valuable constitutents, e.g., hydrogen, may be recovered and returned to the reactor.

From accumulator 18 products comprising hydrocarbons and hydrogen chloride pass into stripping column 21. Within stripping column 21 a normally gaseous fraction comprising hydrogen chloride is removed overhead and recycled through line 22 to line 5 for return to reactor 7. Make-up hydrogen chloride is introduced into the system through line 23. A liquid hydrocarbon fraction comprising branched hexanes, cyclohexane and benzene is taken from stripper 21 through line 24. The hydrocarbon fraction thus produced may be passed to further conventional product separating means from which unconverted hydrocarbons may be recycled to reactor 7.

The process in accordance with the invention is illustrated by the following example.

EXAMPLE

In the isomerization of normal hexane with the aid of a molten melt catalyst comprising aluminum chloride dissolved in antimony trichloride, a straight run hexane fraction, containing 5% w. benzene, is introduced to a catalyst scrubbing zone at the rate of 240,000 lb./hr., of which 12,000 lb./hr. are benzene. The hydrocarbon stream from the scrubber, containing dissolved $AlCl_3$ and $SbCl_3$, is passed to an extraction zone wherein it is contacted with 572,000 lb./hr. of molten antimony trichloride solvent from a catalyst recovery column.

Raffinate from the extraction zone comprising 224,100 lb./hr. isomerizable hydrocarbons, 200 lb./hr. benzene and dissolved catalyst components is charged to a reaction zone. Hydrogen chloride promoter added with the hydrocarbon feed amounts to 3% by weight basis feed. Hydrogen is introduced with the hydrogen chloride amounting to 1% molar of the hydrocarbon feed. The small portion of benzene remaining in the hydrocarbon charged to the reaction zone, 0.1% w. on the basis of total hydrocarbon, is beneficial to the isomerization reaction. Effluent from the reaction zone passes to the catalyst recovery column to separate catalyst components from the hydrocarbon.

Antimony trichloride solvent containing 11,800 lb./hr. of extracted benzene and 3,900 lb./hr. of other hydrocarbons is passed from the extraction zone to the catalyst recovery column. Isomerizate, containing 11,900 lb./hr., is then passed to an HCl stripper column to remove HCl which is recycled to the reaction zone. About 50% of the benzene introduced into the reaction zone, about 100 lb./hr., reacts to form sludge and is removed from the system in the scrubbing zone.

The isomerizate product, containing benzene removed from the feed, is passed through a caustic neutralizer to remove any residual acidic components before being removed as final product.

We claim as our invention:

1. In the isomerization of a saturated isomerizable hydrocarbon containing a minor amount of aromatic hydrocarbon impurity with a molten salt isomerization catalyst comprising aluminum chloride and antimony trichloride in the presence of a hydrogen halide promoter in a reaction zone, the reaction zone effluent passing to a separation zone wherein hydrocarbon isomerization product is separated from a liquid metal halide fraction comprised predominantly of antimony trichloride and a very minor proportion of aluminum chloride, which proportion is substantially less than that comprised in the reaction zone, the improvement which comprises contacting the isomerizable hydrocarbon in an extraction zone with at least a portion of the liquid metal halide fraction withdrawn from said separation zone, recovering a raffinate phase comprising isomerizable hydrocarbon of reduced aromatic content and an extract phase comprising liquid metal halide fraction enriched in aromatics, isomerizing the raffinate phase with said isomerization catalyst and returning the extract phase to the separation zone to recover the aromatics with the isomerization product.

2. The improvement according to claim 1 wherein the reaction zone is an unstirred vertical columnar bed of molten aluminum chloride dissolved in molten antimony trichloride carrier.

3. The improvement according to claim 1 wherein the extraction zone is comprised within a countercurrent column with internal agitators.

4. The improvement according to claim 1 wherein the hydrocarbon isomerizable product is separated from liquid metal halide fraction by means of distillation in a separation zone.

5. In an isomerization process which comprises contacting a straight-run hexane fraction containing benzene with a molten salt isomerization catalyst comprising aluminum chloride and antimony trichloride at isomerization conditions in the presence of hydrogen chloride promoter in a reaction zone and passing the reaction zone effluent to a separation zone to effect separation of hydrocarbon and a liquid metal halide fraction comprised predominantly of antimony trichloride and a very minor proportion of aluminum chloride, which proportion is substantially less than that comprised in the reaction zone, the improvement which comprises contacting the straight-run hexane fraction with a portion of sludge-containing catalyst melt from the reaction zone to recover active catalyst components from the melt, contacting the hexane fraction containing catalyst components in an extraction zone with at least a portion of antimony trichloride withdrawn from said separation zone, recovering a raffinate phase comprising straight-run hexane of reduced benzene content and an extract phase comprising antimony trichloride enriched in benzene, isomerizing the raffinate phase with said isomerization catalyst and returning the extract phase to the separation zone to recover the benzene with the isomerization product.

6. The improvement according to claim 5 wherein the straight-run hexane fraction contains from about 0.5% to 5% by weight benzene and the raffinate from the extraction zone contains no more than 0.1% by weight benzene.

7. The improvement according to claim 5 wherein the extraction zone is operated at a temperature in the range 120°–300° F. and a pressure in the range 200–500 pounds per square inch and the weight ratio of solvent to isomerizable hydrocarbon is from about 1:1 to about 3:1.

8. In an isomerization process which comprises contacting a normal hexane fraction containing from about 0.5% to about 5% by weight benzene with a molten salt isomerization catalyst comprising aluminum chloride and antimony trichloride at isomerization conditions in the presence of hydrogen chloride promoter in a reaction zone and passing the reaction zone effluent to a separation zone to effect separation of hydrocarbon and a liquid metal halide fraction comprised predominantly of antimony trichloride and a very minor proportion of aluminum chloride, which proportion is substantially less than that comprised in the reaction zone, the improvement which comprises contacting the normal hexane fraction in an extraction zone at a temperature in the range 165°–210° F. and a pressure in the range 250–350 p.s.i.g. with at least a portion of antimony trichloride withdrawn from said separation zone, recovering a raffinate phase comprising normal hexane and less than 0.1% by weight benzene and an extract phase comprising antimony trichloride enriched in benzene, isomerizing the raffinate phase with said isomerization catalyst and recovering benzene from the extract phase.

References Cited by the Examiner
UNITED STATES PATENTS

| | | | |
|---|---|---|---|
| 2,373,674 | 4/45 | Crawford et al. | 208—64 |
| 2,421,524 | 6/47 | Ross et al. | 260—683.75 |
| 2,638,441 | 5/53 | Nixon et al. | 208—323 XR |

DANIEL E. WYMAN, *Examiner.*